Aug. 28, 1923.
P. DI CESARE
RESILIENT TIRE
1,466,522
Original Filed March 31, 1922    2 Sheets-Sheet 1
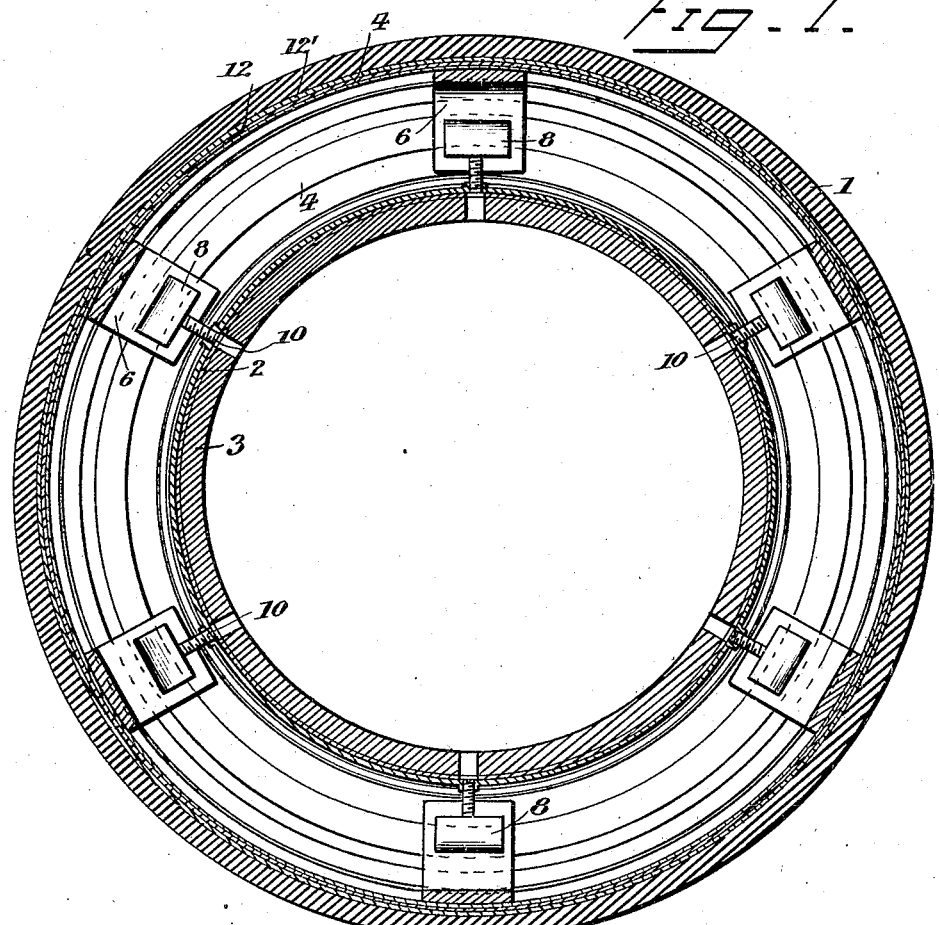
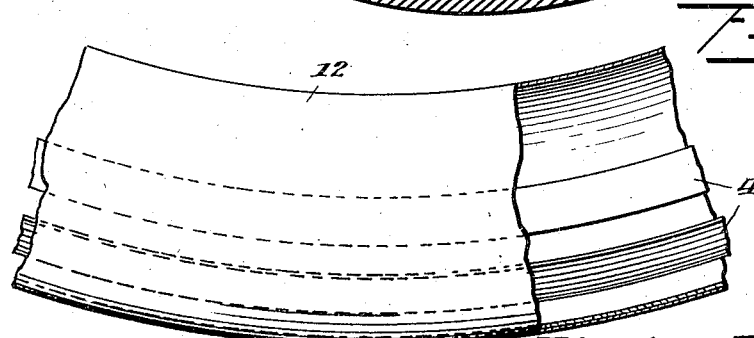
Inventor
*Pierino DiCesare*
By *Jacobi & Jacobi*
Attorneys Aug. 28, 1923.

P. DI CESARE

RESILIENT TIRE

Original Filed March 31, 1922  2 Sheets-Sheet 2

1,466,522

Inventor
Pierino DiCesare

By Jacobi & Jacobi
Attorneys

Patented Aug. 28, 1923.

1,466,522

UNITED STATES PATENT OFFICE.

PIERINO DI CESARE, OF NEW YORK, N. Y., ASSIGNOR TO THE CEASAR RESILIENT TIRE CORPORATION, OF NEW YORK, N. Y.

RESILIENT TIRE.

Application filed March 31, 1922, Serial No. 548,405. Renewed May 10, 1923.

*To all whom it may concern:*

Be it known that PIERINO DI CESARE, a citizen of the United States, residing at New York city, in the county of New York and State of New York, has invented certain new and useful Improvements in Resilient Tires, of which the following is a specification.

This invention relates to resilient tires, particularly the novel construction of the inner tube used to hold the casing in an expanded position.

One of the primary objects of my invention is to provide a resilient tire that embodies all the desirable features of a pneumatic tire, but eliminates the undesirable features of the pneumatic tire such as blow-outs and punctures.

A further object of my invention is to construct a tire of the above stated character comprising an inner tube formed of a series of flexible strips and having means positioned at spaced intervals to connect the strips and hold them in a shape approximate to that of the ordinary inner tube, and means positioned at spaced intervals within the inner tube formed by the flexible strips to hold said inner tube into bearing engagement with the inner surface of the tire casing.

A still further object of my invention is to provide means positioned between the inner tube and casing to prevent injury to the casing caused by the frictional engagement of the flexible strips therewith.

And a still further object of my invention is to provide a resilient tire of the above stated character, which is simple in construction, durable, efficient for the purpose intended and one that can be manufactured and placed on the market at a relatively low cost.

These and like objects of my invention will be better understood as the description proceeds and as is specifically pointed out in the appended claims.

Figure 2:
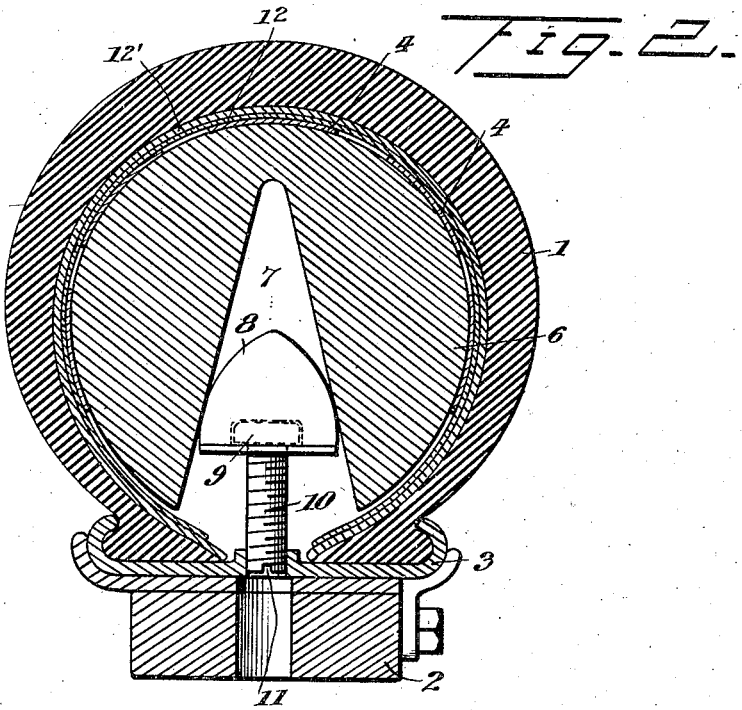
Figure 4:
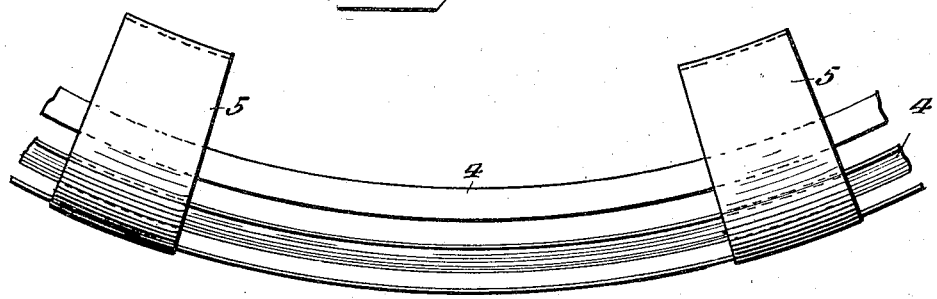

Referring to the accompanying drawings which forms a part of this specification and which clearly illustrates the construction of my resilient tire, Figure 1 is a side elevation of a resilient tire constructed in accordance with my invention, Figure 2 is a transverse section through my improved tire, Figure 3 is an enlarged fragmentary section of the inner tube and covering for same, and Figure 4 is a similar view of a slightly modified form.

Referring to the drawing in detail, like characters of reference will be used to designate like parts in the different views.

The numeral 1 indicates a tire casing of the usual construction and for which no claim is herein made, 2 the felly of a wheel and 3 designates the fastening means as a whole for securing the casing and my improved tube with the felly of the wheel. The fastening means 3 are of any well known construction.

My improved inner tube comprises a series of flexible strips as indicated by the numeral 4, which are curved to conform to the curvature of the inner surface of the casing 1. The flexible strips 4 are curved longitudinally around the inner surface of the casing and are spaced apart from one another. The flexible strips 4 are secured to a covering 12' which is formed of any suitable material and the strips 4 are secured thereto in any suitable manner.

Positioned within the tube formed by the flexible strips 4 and the covering 12' are a series of expansion blocks designated by the numeral 6. These blocks are approximately circular in cross section as indicated in Fig. 2, which permits the block to conform to the shape of the inner tube and the inner surface of the casing. In each of the blocks 6 is provided an inverted V-shaped slot or recess 7 and extends the full length of the block and has the upper portion or apex of the recess terminating at a point adjacent the upper surface of said block. The wedge 8 is loosely mounted on the head 9 of a screw threaded bolt 10. It is to be understood that a wedge and screw threaded bolt is provided for each expansion block, and that the said wedge 8 is located in each block or recess formed in the blocks 6. One end of the bolt 10 is provided with a slot 11 in which a screw driver or other suitable tool may be inserted to force the wedge 8 upwardly in the slot 7, thus causing the blocks to firmly press against the side and top of the casing, thus holding the casing in a position such as same would assume as when a pneumatic inner tube was used.

In order to prevent the flexible strips 4 from coming into contact with the inner surface of the casing 1 and causing wear and tear to same through frictional engagement, I have inserted a covering of cloth or any other suitable material as indicated by the numeral 12, between the flexible strips and the casing 1.

It is to be understood that openings are provided in the entire fastening means 2 and the felly 3 through which the screw threaded bolt 10 carrying the wedge 8 is operated.

In assembling my improved tire, the screw threaded bolt carrying the wedges 8 are positioned around the felly of the wheel, the flexible strips 4 held together by means of the covering 12′ are inserted in the casing 1, after which the blocks 6 are positioned in the inner tube formed by the flexible strips, and the casing containing the inner tube and blocks, said blocks being spaced apart within the inner tube are then placed around the felly of the wheel, after which the casing and inner tube along with the blocks 6 are moved longitudinally on the felly, thus bringing the block into position to be expanded by the wedges 8. It is to be understood that as many screw threaded bolts and wedges can be used as is desired or needed to hold the inner tube and casing in expanded position. From practical experiments it has been found that six expansion blocks and six screw threaded bolts along with said wedges are sufficient to support the heaviest of loads and hold the casing in an expanded position as same would assume in case the pneumatic inner tube was used.

In view of the foregoing description as to the construction and operation of my invention, taken in connection with the accompaying drawing, it is thought that further explanation as to the construction and objects are unnecessary.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts, nor to the kind of material used.

In Fig 4 I have shown a slightly modified form of my invention wherein the flexible strips 4 are held in position by means of transverse bands as indicated by the numeral 5. It is to be understood that I only use the bands 5 when not using the cover 12′.

What I claim as new and desire to secure by Letters Patent is:—

1. A resilient automobile tire comprising an outer casing, an inner tube formed of a series of longitudinal flexible strips, expansion blocks positioned at spaced intervals within the inner tube and means carried by the felly of a wheel to expand the expansion blocks to hold the inner tube and the casing in an expanded position.

2. In a resilient automobile tire comprising a casing, an inner tube formed of a series of flexible strips, means for holding the flexible strips in an adjusted position, expansion blocks positioned at spaced intervals within the inner tube, said blocks being provided with inverted V-shaped recesses, and means carried by the felly of a wheel for engagement with the inverted V-shaped recesses to expand said blocks to hold the inner tube and casing in an expanded position.

3. A resilient automobile tire comprising a casing, an inner tube formed of a series of flexible strips, said strips secured to transverse bands at spaced intervals to hold same in adjusted position, a padding positioned between the casing and inner tube, expansion blocks positioned within said inner tube at spaced intervals and wedges carried by the felly of a wheel at spaced intervals for engagement with the expansion blocks to hold said casing and inner tube in an expanded position.

In testimony whereof I affix my signature.

PIERINO DI CESARE.